(12) United States Patent
Yamada

(10) Patent No.: US 6,189,895 B1
(45) Date of Patent: Feb. 20, 2001

(54) METAL GASKET WITH SEALING AND CONNECTING SECTIONS

(75) Inventor: Yoshio Yamada, Utsunomiya (JP)

(73) Assignee: Ishikawa Gasket Co., Ltd., Tokyo (JP)

( * ) Notice: Under 35 U.S.C. 154(b), the term of this patent shall be extended for 0 days.

(21) Appl. No.: 09/263,492

(22) Filed: Mar. 8, 1999

(30) Foreign Application Priority Data

Mar. 18, 1998 (JP) .................................. 10-068022

(51) Int. Cl.⁷ ...................................... F02F 11/00
(52) U.S. Cl. ..................... 277/591; 277/598; 277/931
(58) Field of Search .................... 277/593, 594, 277/595, 591, 597, 598, 931; 92/169.1

(56) References Cited

U.S. PATENT DOCUMENTS

| | | | |
|---|---|---|---|
| 1,839,336 | * 5/1932 | Oven | 277/598 |
| 1,844,052 | * 2/1932 | Bailey | 277/595 |
| 1,913,736 | * 2/1933 | Victor | 277/594 |
| 4,813,687 | * 3/1989 | Nakayama et al. | 277/595 |
| 5,022,661 | * 6/1991 | Nakasone | 277/595 |
| 5,232,229 | * 8/1993 | Udagawa | 277/597 |
| 5,281,464 | * 1/1994 | Sekioka et al. | 277/595 |
| 5,330,200 | * 7/1994 | Unseth | 277/931 |
| 5,544,900 | * 8/1996 | Aoki | 277/594 |
| 5,590,888 | * 1/1997 | Brummer et al. | 277/594 |
| 5,725,223 | * 3/1998 | Yamada et al. | 277/598 |

* cited by examiner

Primary Examiner—Anthony Knight
Assistant Examiner—Vishal Patel
(74) Attorney, Agent, or Firm—Kanesaka & Takeuchi

(57) ABSTRACT

A metal gasket is used for an internal combustion engine, preferably as a manifold gasket. The gasket is formed of a plurality of metal gasket sections, and at least one metal connecting section situated between two gasket sections adjacent to each other to connect the same. Each gasket section has a sealing hole to be sealed and a sealing device situated around the sealing hole. At least one through hole is formed in the connecting section. The through hole allows the connecting section to easily deform to absorb deformation of the gasket due to expansion and contraction of the engine. The gasket with the deformable connecting section can be easily and accurately formed.

10 Claims, 4 Drawing Sheets

METAL GASKET WITH SEALING AND CONNECTING SECTIONS

BACKGROUND OF THE INVENTION AND RELATED ART STATEMENT

The present invention relates to a metal gasket with sealing and connecting sections, which is especially useful for a manifold gasket of an internal combustion engine.

In an internal combustion engine, a plurality of exhaust holes communicating with combustion chambers is situated at one side of a cylinder head and is connected to branch portions of a manifold pipe through manifold gaskets. The manifold gasket is installed between one exhaust hole and one branch portion, but since the exhaust holes are arranged at one side of the engine, in order to easily install the manifold gaskets to the required portions, one manifold gasket with a plurality of sealing sections connected by connecting sections is often used. Each sealing section is located between one exhaust hole and one branch portion to securely seal therebetween.

This gasket can be installed easily to the engine. However, since an exhaust gas with high temperature flows through the exhaust holes, the gasket attaching portions of the cylinder head and the exhaust pipe deform by the high temperature exhaust gas. Accordingly, the sealing sections connected by the connecting sections are subjected to lateral forces, i.e. pulled or pushed through the connecting sections whenever the engine is actuated. As a result, the sealing sections connected by bolts may be moved between the gasket attaching portion of the cylinder head and the branch portion of the exhaust pipe to cause mis-alignment therebetween, or the sealing sections may have cracks or damages. Thus, the sealing ability is reduced or damaged.

In view of the above problems, a manifold gasket 10 as shown in FIG. 1, generally disclosed in U.S. Pat. No. 4,728,110, had been made. The manifold gasket 10 includes sealing sections 11 and connecting sections 12 between the sealing sections 11. Each sealing section 11 has an exhaust hole 13, two bolt holes 14 and a bead 15 around the exhaust hole 13, while each connecting section 12 includes a buffer or pressure absorbing portion 16 in a U-shape in section. The absorbing portion 16 expands or contracts according to expansion or contraction of the engine to absorb changes in length between the exhaust holes 13.

The above gasket 10 can properly absorb the change in length between the exhaust holes when the gasket is used. However, when the gasket is prepared, it is difficult to precisely set the length between the exhaust holes because of the buffer. Thus, the exhaust holes and the bolt holes may not be precisely located on the predetermined places or the bead 15 on a plate may be dislocated relative to the other plate. As a result, the exhaust holes in the engine can not be properly sealed by the gasket.

Also, since the buffer has a flexibility, the gasket may be damaged in handling the gasket, or the gasket can not be easily installed on the engine. Further, since the relatively large buffer is formed in the connecting section, when the gasket is formed, an additional step for forming the buffer is required, resulting in increasing the manufacturing cost.

The present invention has been made in view of the above problems in the conventional gasket, and an object of the invention is to provide a metal gasket with sealing and absorbing sections, which can securely seal around the holes to be sealed even if the gasket is subjected to expansion and contraction forces repeatedly.

Another object of the invention is to provide a metal gasket as stated above, wherein the sealing sections of the gasket can be formed easily and precisely while the absorbing section can absorb deformation of the engine.

A further object of the invention is to provide a metal gasket as stated above, which can be installed relatively easily on the engine without deformation.

Further objects and advantages of the invention will be apparent from the following description of the invention.

SUMMARY OF THE INVENTION

A metal gasket of the invention is used for an internal combustion engine, and is especially suitable for a manifold gasket. The gasket is formed of a plurality of metal gasket sections, each having a sealing hole to be sealed and sealing means situated around the sealing hole to seal therearound; at least one metal connecting section situated between two gasket sections adjacent to each other to connect the same; and at least one through hole disposed in the connecting section. The through hole allows the connecting section to easily deform to absorb deformation of the gasket due to expansion and contraction of the engine.

In the invention, since the through hole is formed in the connecting section, the connecting section can be deformed relatively easily to absorb pressure applied to the gasket when the engine is actuated. Since the connecting section is deformed easily, the gasket section is not substantially affected by expansion and contraction of the engine and can securely seal around the hole to be sealed. Also, the gasket section is not damaged.

Preferably, the gasket sections and the at least one connecting section are formed on one metal plate and arranged side by side as one unit. As a result, when the gasket is prepared, the sealing holes and the at least one through hole can be formed at the same time to easily form the gasket. Each gasket section may have one or more plates to increase sealing ability at the gasket section.

The connecting section may have a shape similar to a diamond shape with two sharp points orienting opposite to each other. A line connecting the two sharp points orients substantially perpendicular to a line connecting the centers of the sealing holes. In this case, the through hole may have a diamond shape arranged similarly in a middle of the connecting section. In this configuration, the connecting section can be easily deformed when lateral force is applied to the gasket sections. Also, the gasket can be formed easily.

If a bead is formed along the edge of the connecting section, the rigidity of the connecting section is increased, though the through hole is formed in the connecting section. Thus, when the gasket is handled, the gasket is not bent easily to improve the handling of the gasket. The gasket can be handled easily in installing the gasket.

The connecting section may have a plurality of small through holes. Also, the through hole may have an elongated shape perpendicular to a line connecting the centers of the sealing holes, or oval shape. When the through hole or holes is formed, the material to be used in the gasket is reduced. Thus, the manufacturing cost and the weight of the gasket are also reduced.

DETAILED DESCRIPTION OF PREFERRED EMBODIMENTS

Figure 1:
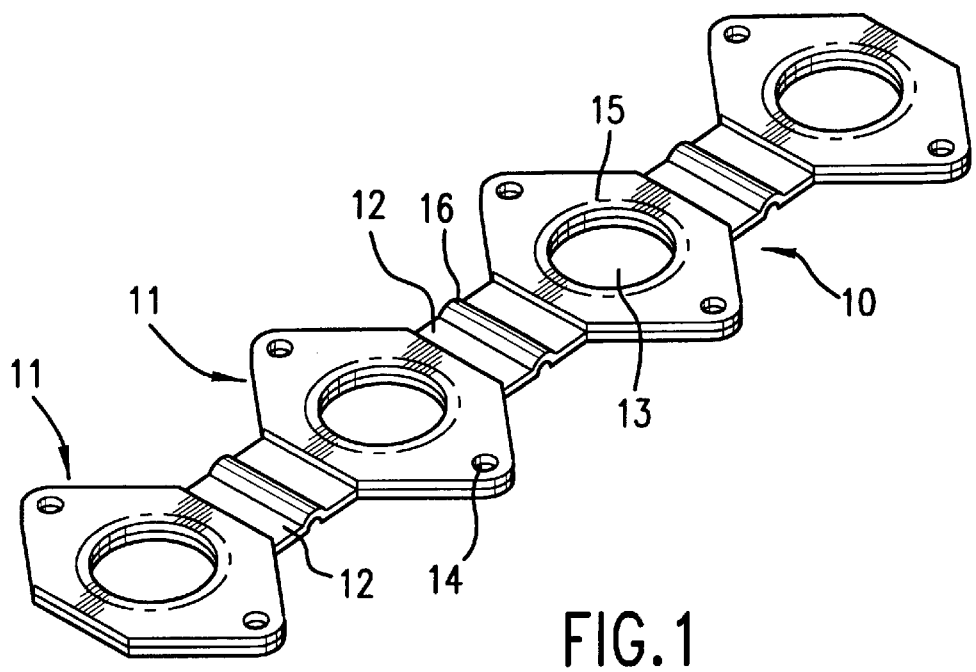
FIG. 1 is a perspective view of a conventional manifold gasket.
Figure 2:
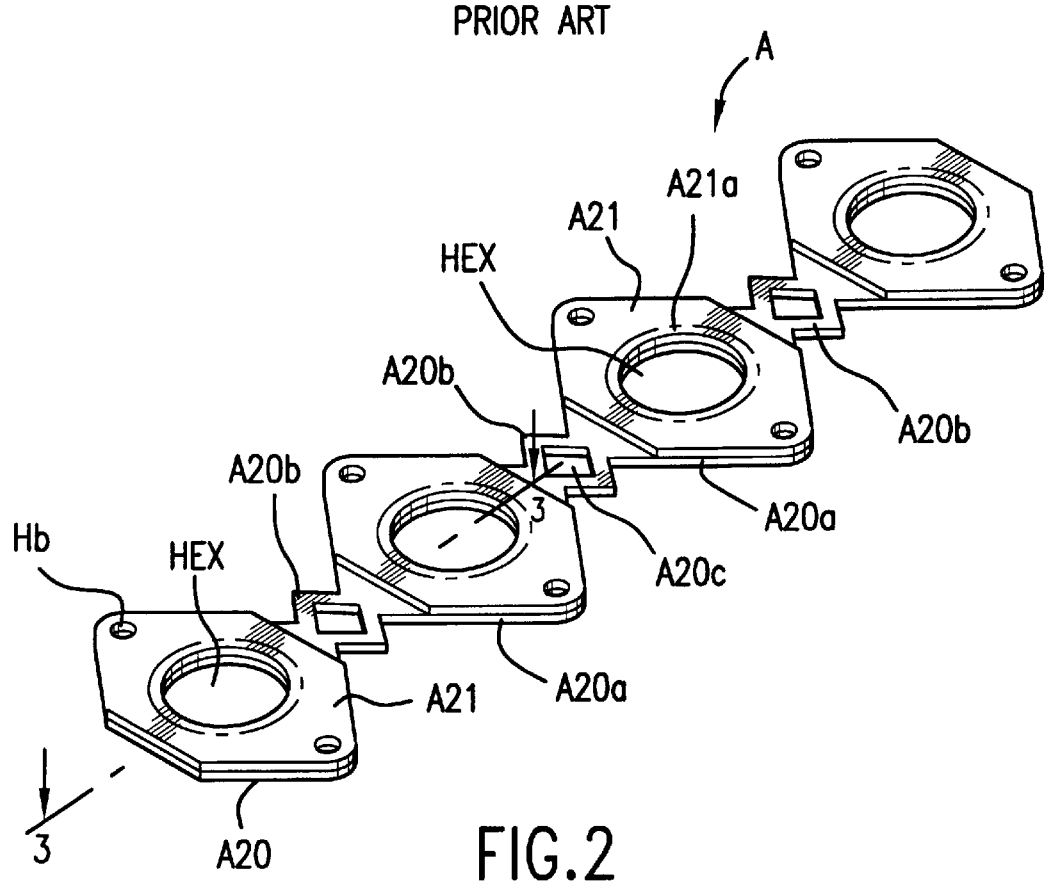
FIG. 2 is a perspective view of a first embodiment of a manifold gasket of the invention.
Figure 3:
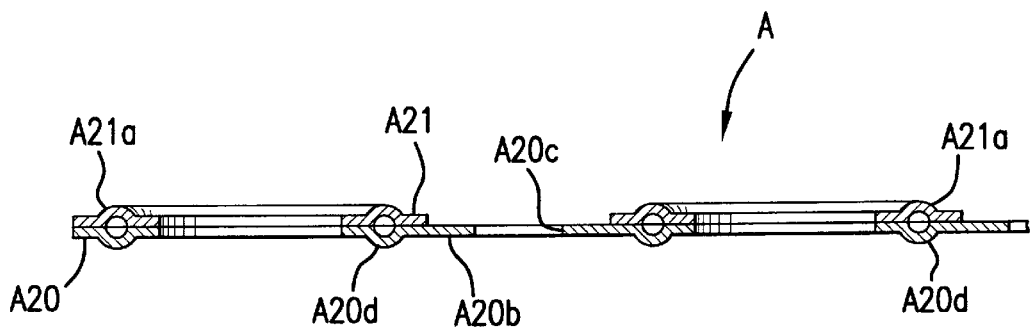
FIG. 3 is an enlarged sectional view taken along line 3—3 in FIG. 2.

A first embodiment A of a manifold gasket of the invention is explained with reference to FIGS. 2 and 3. The gasket A is formed of a base plate A20 extending substantially throughout an entire area of the gasket, and four sealing plates A21 attached to the base plate A20.

The base plate A20 includes four sealing portions A20a, and three connecting portions A20b integrally formed together as one unit. Each sealing portion A20a has one exhaust hole Hex, two bolt holes Hb, and a bead A20d as sealing means around the exhaust hole Hex.

Each connecting portion A20b is situated between two sealing portions A20a adjacent to each other. The connecting portion has a shape similar to diamond with two points projecting outwardly from the base plate A20, and a diamond shape hole A20c. Thus, a line connecting two points orients substantially perpendicularly to a line extending through the centers of the exhaust holes Hex.

The sealing plate A21 has a shape similar to the sealing portion A20a, and includes the exhaust hole, two bolt holes and a bead A21a around the exhaust hole. The sealing plate A21 is attached to the base plate A20 by spot welding.

The gasket A is installed between a gasket attaching portion of a cylinder head and branch portions of a manifold (both not shown), as in the conventional gasket. Namely, each manifold hole of the gasket communicates with an exhaust hole of the cylinder head and a hole of the branch portion of the manifold, and bolts fixed to the cylinder head pass through the bolt holes of the gasket A and the branch portion. Then, nuts are disposed on the bolts, and are tightened, so that the manifold is securely attached to the cylinder head through the manifold gasket A. The beads A20d, A21a are compressed to securely seal between the branch portion and cylinder head.

When the engine is actuated, an exhaust gas with high temperature flows through the exhaust holes to the manifold. Accordingly, the cylinder head and the manifold deform by the high temperature gas. Generally, the distance between the exhaust holes of the cylinder head increases due to expansion of the cylinder head. Since the sealing portions A20a are fixed to the cylinder head and the manifold, each connecting portion A20b receives an expansion force to expand the gasket in the longitudinal direction. In the invention, since the connecting portions A20b are deformable because of the hole A20c, upon receiving the expansion force at the connecting portions, the connecting portions A20b deform and expand in the longitudinal direction. Thus, the expansion force applied to the sealing portions A20a can be properly absorbed by the connecting portions A20b without substantially affecting the sealing portions A20a.

When the engine is stopped, the engine is gradually cooled, so that the cylinder head and the manifold return to the original shapes. At this time, although the contraction force is applied to the gasket, the contraction force is also absorbed by the connecting portions A20b without affecting the sealing portions A20a. The sealing portions A20a are not damaged when the gasket is used, and the gasket A can securely seal between the cylinder head and the manifold.

In the gasket A, since the hole is simply formed in the connecting portion, the gasket can be formed precisely without causing a dimensional error. Also, since the hole in the connecting portion can be easily formed by a punching process together with the process of forming the gasket, the gasket need not have additional step in forming the connecting section. Further, since the sealing portions do not substantially move when the gasket is used, the sealing portions are not damaged by the expansion and contraction of the gasket.

Figure 4:
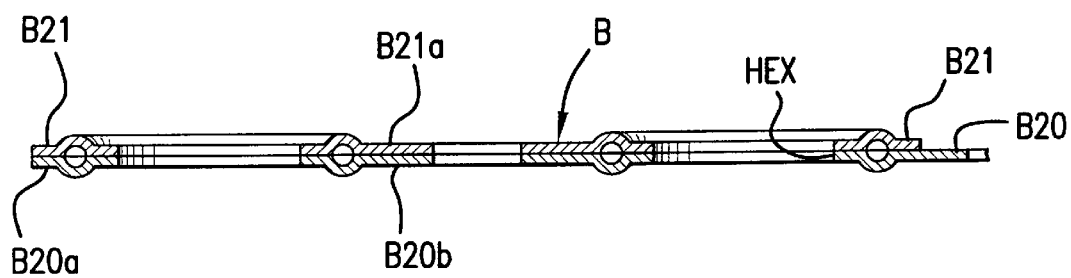
FIGS. 4 and 5 are sectional views, similar to FIG. 3, for showing second and third embodiments of the invention.

FIG. 4 shows a second embodiment B of a manifold gasket of the invention. The gasket B is formed of a base plate B20 having sealing portions B20a and connecting portions B20b, and sealing plates B21, similar to the gasket A. In the gasket B, however, two sealing plates B21 are connected together by a connecting portion B21a and are laminated on the base plate B20. The connecting portion B21a has the same structure as in the connecting portion B20b, which is the same as the connecting portion A20b. The rest of the structure of the gasket B is the same as that of the gasket A. The gasket B operates as in the gasket A.

Figure 5:
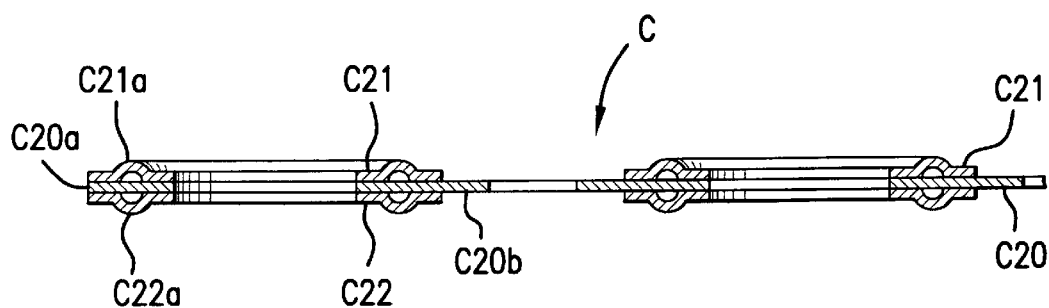

FIG. 5 shows a third embodiment C of a manifold gasket of the invention. The gasket C is formed of a base plate C20 having sealing portions C20a and connecting portions C20b, and sealing plates C21, each having a bead C21a, similar to the gasket A. The gasket C includes, in addition to the basic structure, sealing plates C22, each having a bead C22a, at a side opposite to the sealing plates C21. The sealing plates C21, C22 are connected to the base plate C20 by spot welding. The rest of the structure of the gasket C is the same as that of the gasket A. The gasket C operates as in the gasket A.

Figure 6:
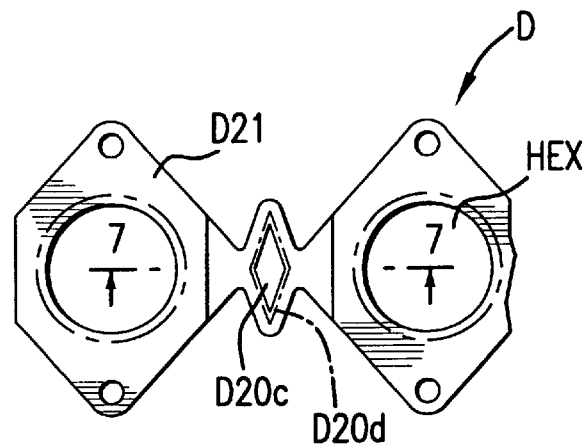
FIG. 6 is a plan view of a part of a fourth embodiment of the invention.
Figure 7:
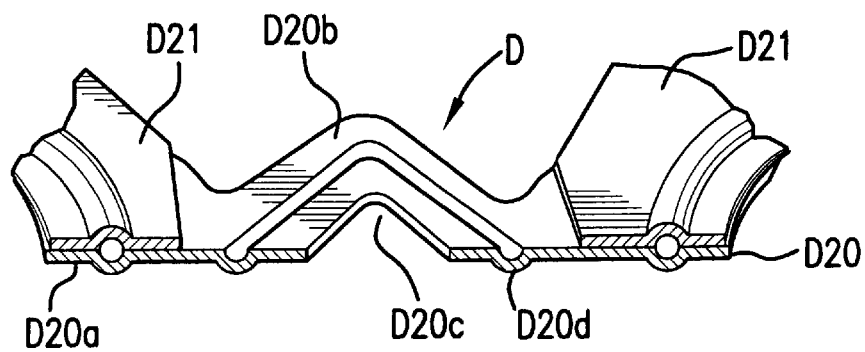
FIG. 7 is an enlarged perspective sectional view taken along line 7—7 in FIG. 6.

FIG. 6 shows a fourth embodiment D of a manifold gasket of the invention. The gasket D is formed of a base plate D20 with sealing portions D20a and connecting portions D20b, and sealing plates D21, as in the gasket A. As shown in FIG. 7, the gasket D further includes a bead D20d around a hole D20c at the connecting portion D20b. Since the bead D20d is formed to surround the hole D20c, the flexibility of the connecting portion D20b is limited. Namely, since the hole D20c is formed in the connecting portion D20b, the connecting portion D20b is flexible, i.e. bent easily. As a result, when the gasket is handled or installed, the gasket may not be handled properly to cause a damage. However, since the gasket D includes the bead D20d at the connecting portion D20b, the connecting portion D20b is reinforced and does not bend so easily. Therefore, handling of the gasket is improved in the gasket D. The rest of the structure of the gasket D is the same as the gasket A and operates as in the gasket A.

FIGS. 8–11 show fifth to eighth embodiments E–H of manifold gaskets of the invention. Each of the gaskets E–H is formed of a base plate E20–H20 having sealing portions and connecting portions, and sealing plates E21–H21 laminated on the sealing portions, as in the gasket A. However, the connecting portions of the gaskets E–H are different in structure.

Figure 8:
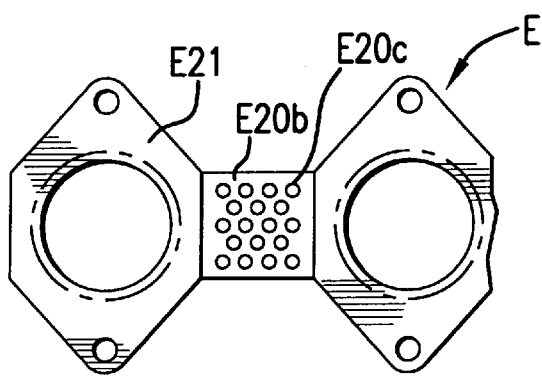
FIGS. 8–12 are plan views, similar to FIG. 6, for showing fifth to ninth embodiments of the invention.
Figure 9:
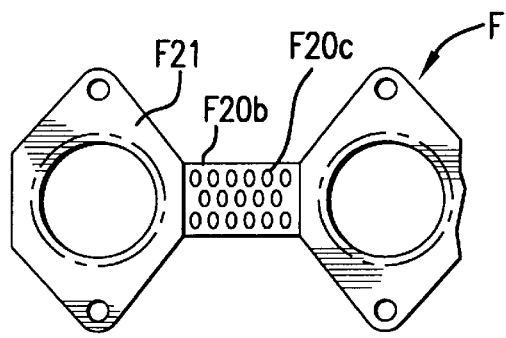
Figure 10:
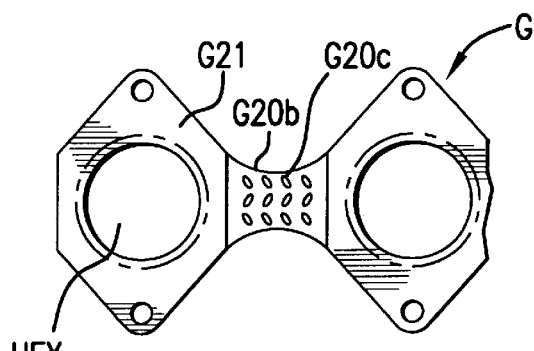

The gasket E as shown in FIG. 8 has the connecting portions E20b having a plurality of small circular holes E20c. The gasket F in FIG. 9 has the connecting portions F20b having a plurality of small holes F20c with an oval shape. The gasket G in FIG. 10 has the connecting portions G20b having a plurality of small oval holes G20c. The oval holes G20c incline relative to a line connecting the two centers of the exhaust holes Hex, i.e. longitudinal direction. Since the oval holes G20c are inclined, when the connecting portion G20b receives expansion and contraction forces, the connecting portion can be deformed relatively easily.

Figure 11:
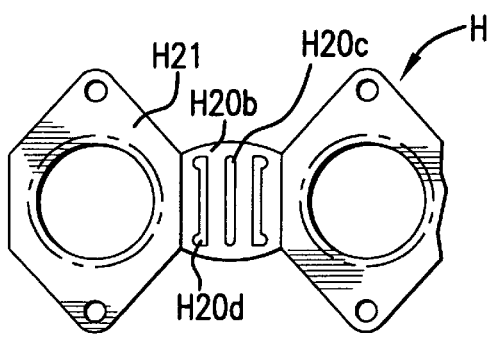

The gasket H in FIG. 11 has three elongated holes H20c, H20d in the connecting portion H20b. The elongated hole H20c has a simple linear shape, but the elongated hole H20d has end portions orienting toward the nearest sealing portion. The elongated holes H20c, H20d extend perpendicularly to the longitudinal direction of the gasket, so that when the connecting portion receives expansion and contraction forces, the connecting portions can be deformed easily.

Figure 12:
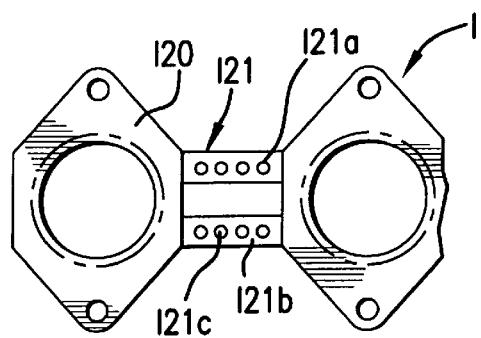

FIG. 12 shows a ninth embodiment I of the manifold gasket of the invention. The gasket I is formed of a plurality of sealing portions I20 and connecting portions I21, as in the gasket A. However, the sealing portion I20 is formed of two plates, such as the sealing plates C21, C22 shown in FIG. 5, laminated and connected together. The connecting portion I21 is formed of two portions I21a, I21b with holes I21c, which are connected at both ends to the adjacent sealing portions I20 by welding. Though the gasket I requires a complicated process, the gasket I operates as in the gasket A.

In the gasket of the invention, the connecting portion has at least one through hole formed by punching process to thereby form a portion to absorb heat deformation of the gasket. Therefore, the gasket can be formed easily, and the dimensional accuracy of the gasket is assured.

In the gasket of the invention, when the expansion and contraction forces are applied to the gasket A, the connecting portions can absorb the expansion and contraction forces applied to the gasket. In this case, since the sealing portions do not substantially move from the sealing areas when the engine is subjected to the heat expansion and contraction, the sealing portions can securely seal between the cylinder head and the manifold. The sealing portions of the gasket are not damaged by the heat expansion and contraction.

Further, since the through holes are formed in the connecting portions, the material used for the gasket can be saved and it is possible to provide a light weight gasket.

While the invention has been explained with reference to the specific embodiments of the invention, the explanation is illustrative and the invention is limited only by the appended claims.

What is claimed is:

1. A metal gasket for an internal combustion engine, comprising:
    one metal plate,
    a plurality of metal gasket sections formed on the metal plate, each having a sealing hole to be sealed and sealing means situated around the sealing hole to seal therearound,
    at least one generally flat metal connecting section made by only said one metal plate and situated between two of the gasket sections adjacent to each other to connect the same, and
    at least one through hole situated in the connecting section, said at least one through hole being arranged to allow the connecting section to easily deform along a line connecting centers of the sealing holes to absorb deformation of the gasket due to expansion and contraction of the engine.

2. A metal gasket according to claim 1, wherein said connecting section has a bead along an edge thereof for reinforcing the connecting section.

3. A metal gasket according to claim 1, wherein each of said metal gasket sections includes at least one sealing plate having one sealing hole and fixed to said one metal plate at the gasket section without forming the connecting section.

4. A metal gasket according to claim 3, wherein said connecting section has a bead around the at least one through hole with the diamond shape for reinforcing the connecting section, and said sealing means is a bead around the sealing hole.

5. A metal gasket according to claim 3, wherein each of said gasket sections is formed of a plurality of metal plates laminated together.

6. A metal gasket according to claim 1, wherein said connecting section includes a plurality of through holes.

7. A metal gasket according to claim 6, wherein said through holes have elongated shapes perpendicular to the line connecting centers of the sealing holes.

8. A metal gasket according to claim 6, wherein said through holes have oval shapes and are arranged side by side along a longitudinal direction of the gasket.

9. A metal gasket according to claim 8, wherein each of the through holes in the oval shapes are inclined relative to the longitudinal direction.

10. A metal gasket for an internal combustion engine, comprising:
    a plurality of metal gasket sections, each having a sealing hole to be sealed and sealing means situated around the sealing hole to seal therearound,
    at least one metal connecting section situated between two of the gasket sections adjacent to each other to connect the same, said plurality of gasket sections and said at least one connecting section being formed on one metal plate and arranged side by side as one unit, said at least one connecting section having a shape similar to a diamond shape with two sharp points orienting opposite to each other, a line connecting said two sharp points extending substantially perpendicular to a line connecting centers of the sealing holes, and
    at least one through hole situated in the connecting section and having a diamond shape arranged similarly in a middle of said at least one connecting section, said at least one through hole allowing the connecting section to easily deform to absorb deformation of the gasket due to expansion and contraction of the engine.

* * * * *